United States Patent [19]
Smith

[11] Patent Number: 5,390,757
[45] Date of Patent: Feb. 21, 1995

[54] INTRA-WHEEL REAR SUSPENSION SYSTEM FOR MOTORCYCLES

[75] Inventor: Jefferson R. Smith, Huntington Beach, Calif.

[73] Assignee: Dew Manufacturing Company, Inc.

[21] Appl. No.: 154,936

[22] Filed: Nov. 19, 1993

[51] Int. Cl.$^6$ .............................................. B62K 11/00
[52] U.S. Cl. ...................................... 180/227; 280/283
[58] Field of Search ................. 180/219, 227; 280/275, 280/283, 688, 690

[56] References Cited

U.S. PATENT DOCUMENTS

| | | | |
|---|---|---|---|
| 1,197,526 | 9/1916 | Mesecke | 180/219 |
| 2,164,413 | 7/1939 | Kuehn | 180/227 |
| 4,552,373 | 11/1985 | Kawaguchi et al. | 180/219 |

FOREIGN PATENT DOCUMENTS

| | | | |
|---|---|---|---|
| 0469475 | 2/1992 | European Pat. Off. | 180/219 |
| 3222262 | 12/1983 | Germany | 280/275 |

*Primary Examiner*—Kenneth R. Rice
*Assistant Examiner*—Victor E. Johnson
*Attorney, Agent, or Firm*—Plante & Strauss

[57] ABSTRACT

An intra-hub suspension system for a wheel, particularly a motorcycle wheel although it can be adapted for use in other vehicles, e.g., airplane wheels, etc. The wheel is provided with an outer hub that is rotationally mounted on a stationary inner hub. The inner and outer hubs have a substantial diameter, e.g., from about 50% to 80% of the wheel diameter to provide an inner hub chamber of sufficient dimension for housing of an intra-hub suspension system. The intra-hub suspension system is received within the inner hub compartment and is fixedly secured thereto. The suspension system comprises a stationary frame having, on its opposite vertical interior sides, an arcuate cam with a curvature substantially equal to the radius about the drive sprocket of the motorcycle. Received within the frame is a carrier mechanism having a plurality of bearings that serve as rolling followers of a cam surface. The carrier has an outboard shoulder opposite an outboard shoulder of the frame between which are captured a plurality of compression springs. At its opposite side, the frame and carrier have a second pair of opposed shoulders which coact reciprocally to the first set of shoulders and a second plurality of springs is captured between the second pair of opposed shoulders. The frame is fixedly secured to the inner hub and the carrier receives the support shaft for the rear wheel.

10 Claims, 6 Drawing Sheets

5,390,757

INTRA-WHEEL REAR SUSPENSION SYSTEM FOR MOTORCYCLES

BACKGROUND OF THE INVENTION

1. Field of Invention.

This invention relates to a wheel suspension and, in particular to an intra-hub suspension for the rear wheel of a motorcycle.

2. Brief Statement of the Prior Art

Motorcycle rear suspensions have commonly used outboard shock absorbers or springs that are mounted outboard from the rear axle to provide a suspension between the rear axle and the frame. These suspensions are not ideally suited for the application; the outboard shock absorbers clutter the appearance of the motorcycle.

Additionally, the suspensions which provide for relative movement of the rear wheel and the frame, unavoidably result in changing of the tension of the drive chain, as the suspensions do not arc on a radius corresponding to the drive chain. The result is high wear and inefficiency of the drive chain system.

In the early 1950's Triumph attempted to market an intra-hub suspension system for the rear wheel of a motorcycle in which a suspension assembly of springs and cam and cam followers were mounted within the hub of the rear wheel. This attempt was aborted after a short period, approximately one year, and no further attempts have been made to provide an intra-hub suspension system, despite the desirable features in appearance and chain longevity that such a mechanism can provide.

OBJECTS OF THE INVENTION

It is an object of this invention to provide an improved suspension for a wheel.

It is an additional object of this invention to provide an improved suspension which is entirely contained within the hub of a wheel of a vehicle.

It is a further object of this invention to provide an improved suspension system for the reef wheel of a motorcycle.

It is still an additional object of this invention to provide an improved suspension for the rear wheel of a motorcycle which will increase chain life and decrease wear and maintenance requirements.

It is yet a further object of the invention to provide a suspension system for the rear wheel of a motorcycle that provides relative movement of the wheel in an arc about the drive sprocket of the motorcycle.

It is a further object of this invention to provide a motorcycle that provides extended wear characteristics and an uncluttered appearance.

BRIEF STATEMENT OF THE INVENTION

This invention comprises an intra-hub suspension system for a wheel. It is of particular application to a motorcycle wheel although it can be adapted for use in other vehicles, e.g., airplane wheels, etc.

In the suspension system, the wheel is provided with an outer hub that is rotationally mounted on a stationary inner hub. The inner and outer hubs have a substantial diameter, e.g., from about 50% to 80% of the wheel diameter to provide an inner hub chamber of sufficient dimension for housing of an intra-hub suspension system.

The intra-hub suspension system is received within the inner hub compartment and is fixedly secured thereto. The suspension system comprises a stationary frame having, on its opposite vertical interior sides, an arcuate cam that approximates the radius about the drive sprocket of the motorcycle. Received within the frame is a carrier mechanism having a plurality of bearings that serve as rolling followers of a cam surface. The carrier has an outboard shoulder opposite an outboard shoulder of the frame between which are captured a plurality of compression springs. At its opposite side, the frame and carrier have a second pair of opposed shoulders which coact reciprocally to the first set of shoulders and a second plurality of springs is captured between the second pair of opposed shoulders. The frame is fixedly secured to the inner hub and the carrier receives the support shaft for the rear wheel.

DESCRIPTION OF PREFERRED EMBODIMENT

Figure 1:
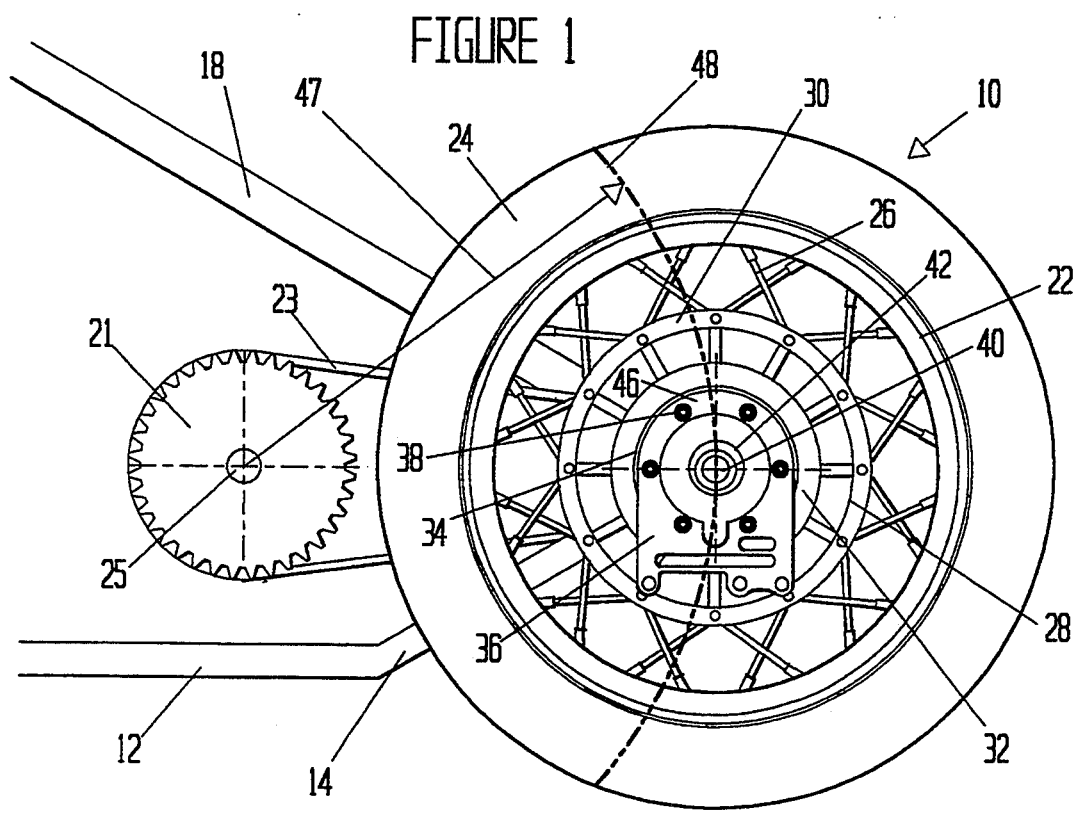
FIG. 1 illustrates the invention as installed on a motorcycle.

Referring now to FIG. 1, there is illustrated the rear wheel 10 for a motorcycle showing a rear portion of the motorcycle frame 12. The rear frame 12 is unencumbered with external appendages such as outboard shock absorbers and the like and has no suspension mechanisms such as trailing arms and the like. Instead, the rear frame 12 is formed simply with a lower rail 14 and a triangular truss 18 which is an integral part of the motorcycle frame. The rear frame 12 has a fork 18 with lateral arms 20 which support the rear wheel 10. The arms are illustrated broken away to avoid obscuring the wheel 10. The rear wheel 10 has a conventional rim 22 which supports a tire 24 and which is rigidly secured to the wheel hub by spokes 26, or webbing. The drive sprocket 21 of the motorcycle is on shaft 25 and linked to rear wheel 10 by a flexible drive 23.

The wheel hub 28 is formed with an outer hub 30 in the form of a cylindrical ring that is rotationally mounted on a concentric inner hub 32.

The inner hub 32 has a central boss 34 that is fixedly secured to an inner hub mounting flange 36 with a six bolt fasteners 38. The inner hub mounting flange 36 is fixedly secured to the frame of the motorcycle, e.g., to the lateral arm 20 of the fork of the motorcycle, thus supporting the inner hub 32 in a rotationally fixed relationship to the frame 12.

The rear shaft 40 of the motorcycle extends through the inner hub 32, through a large diameter central hole 42 in the mounting flange 36 on each side of the inner hub 32. The central holes 42 are closed with flexible boots 46 formed of a suitable elastomer, e.g., synthetic or natural rubber. Thus, it can be seen that the entire rear wheel 10, is free to move vertically relative to the frame 12. This movement is directed along an arc 48 about the drive sprocket 21 of the motorcycle, such that any vertical movement of the rear wheel does not alter the tension on the drive.

Figure 2:
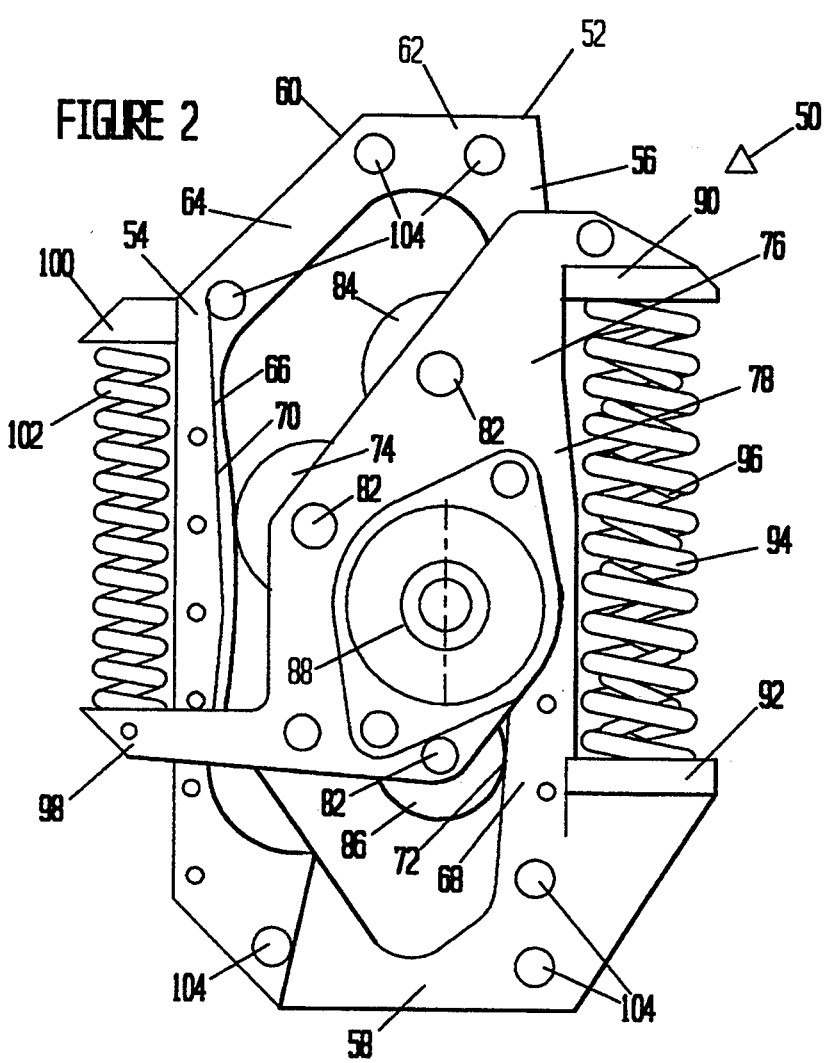
FIG. 2 is an elevational view of the intra-hub shock absorber of the invention.

The inner hub 32 of the wheel has an interior chamber and the shock absorber of the invention is received within that inner chamber. FIG. 2 shows the shock absorber mechanism 50 in an elevational view. As there illustrated, the mechanism 50 comprises a track frame 52 having upright opposite sides 54 and 56, and a bottom wall 58 at substantial right angles thereto. At its upper end 60, the track frame 52 has a cross bar 62 which can have an included leg portion 64, thus reducing its overall dimensions.

The opposite interior vertical sidewalls 66 and 68 of the shock absorber mechanism 50 are provided with inclined cam surfaces 70 and 72. These cam surfaces 70 and 72 provide for bearing contact with the cam followers which are rollers 74, 84 and 86, which are rotationally mounted in a carrier assembly 76 received within the track frame 52. The carrier assembly 76 has opposite first and second side plates 78 which are drilled at three appropriate locations 82 to receive assembly bolts which also serve as the mounting shafts for the rollers 74, 84 and 86. A total of three rollers are provided, located in a triangular array with two rollers 84 and 86 serving as followers on the cam surface 72 and roller 74 serving as a follower on the opposite cam surface 70. The rear shaft 40 of the motorcycle is received in a journal 88 carried each of the opposite side plates 78.

The carrier assembly 76 has an upper fixed abutment 90 that is vertically opposite a similar abutment 92 which projects integrally from the track frame 52. A plurality of springs, preferably a first pair 94 of large diameter springs within which are nested a second pair 96 of lesser diameter springs are captured between the upper abutment 90 of the carrier and lower abutment 92 of the track frame 52. As described hereinafter, these springs serve as the shock absorbers for the wheel.

On its opposite side, the carrier assembly 76 has a lower fixed abutment 98 which is opposite an upper abutment 100 that integrally projects from the track frame. A third plurality of compression springs 102 is captured between the lower abutment 98 of the carrier assembly 76 and the upper fixed abutment 100 of the track frame 52 serving, as hereinafter described, as dampening or rebound springs for the shock absorbing mechanism.

The track frame 52 has a plurality of six through apertures 104 in a preselected pattern for fixed attachment of the opposite side plates of the inner hub, forming an inner hub assembly, as described hereinafter.

Figure 3:
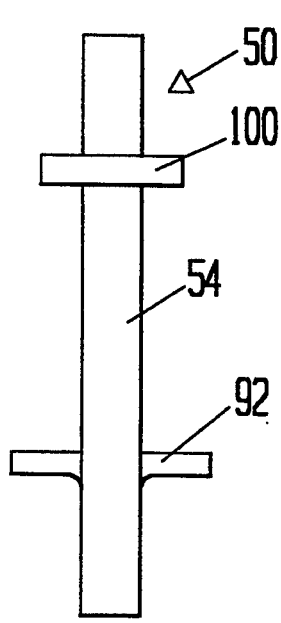
FIGS. 3 through 8 illustrate the major components of the shock absorber.
Figure 4:
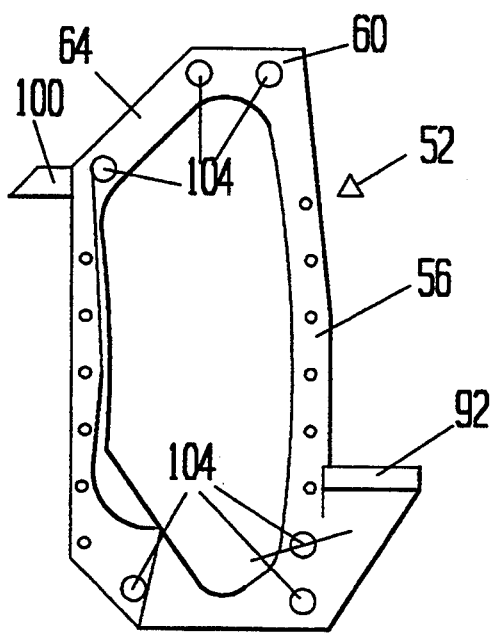
Figure 5:
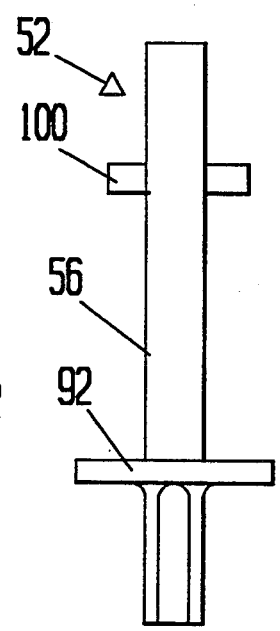
Figure 6:
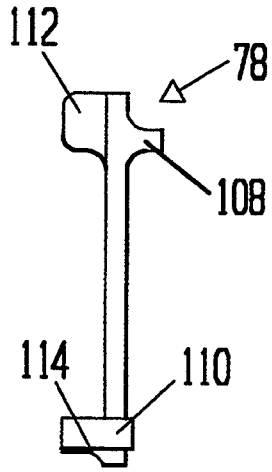
Figure 7:
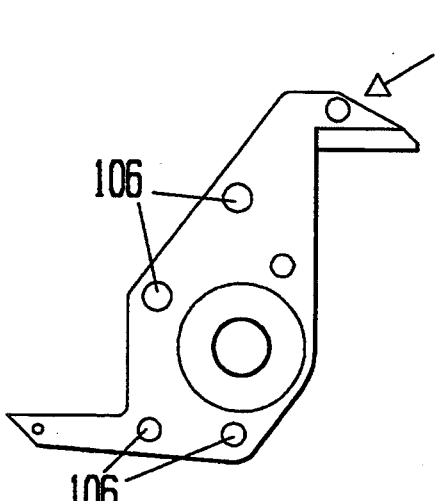
Figure 8:
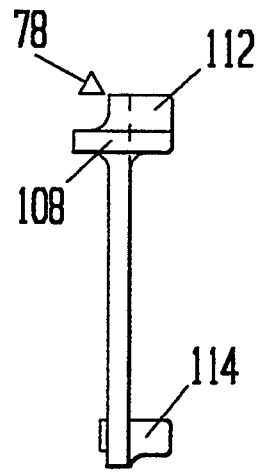

The track frame 52 is shown in FIGS. 3 through 5, with FIGS. 3 and 5 comprising opposite end views and FIG. 4 a side elevational view. As previously mentioned, the inside vertical side walls 66 and 68 of the frame are inclined, forming cam surfaces 70 and 72. The two opposite cam surfaces are formed about the radius 47, thus corresponding to the distance of the rear shaft 40 from the drive sprocket on the output shaft of the motorcycle transmission, typically from 17-25, preferably about 20 inches. In other applications, the cam surface can be entirely vertical or can have other configurations, depending upon the desired movement of the wheel relative to the frame or its supporting structure. For example, in applications for the main gear of aircraft, the invention can be used as shock absorbers for the aircraft wheels, and in this application, the cam surfaces can be vertical, without an arcuate cam or can be canted rearwardly, as desired for optimum performance. The carrier assembly 76 is formed by assembly of two identical carrier side plates 81, which are shown in FIGS. 6 through 8. The carrier plates 78 are bolted together about the track frame. For this purpose, a plurality of aligned apertures 106 are provided to receive the carrier assembly bolts, which also serve as bearing shafts for the rollers 74, 84 and 86 (shown in FIG. 2). Each carrier side plate 81 has an upper integral abutment 108 and a lower integral abutment 110, which preferably are reinforced with flanges 112 and 114.

Figure 9:
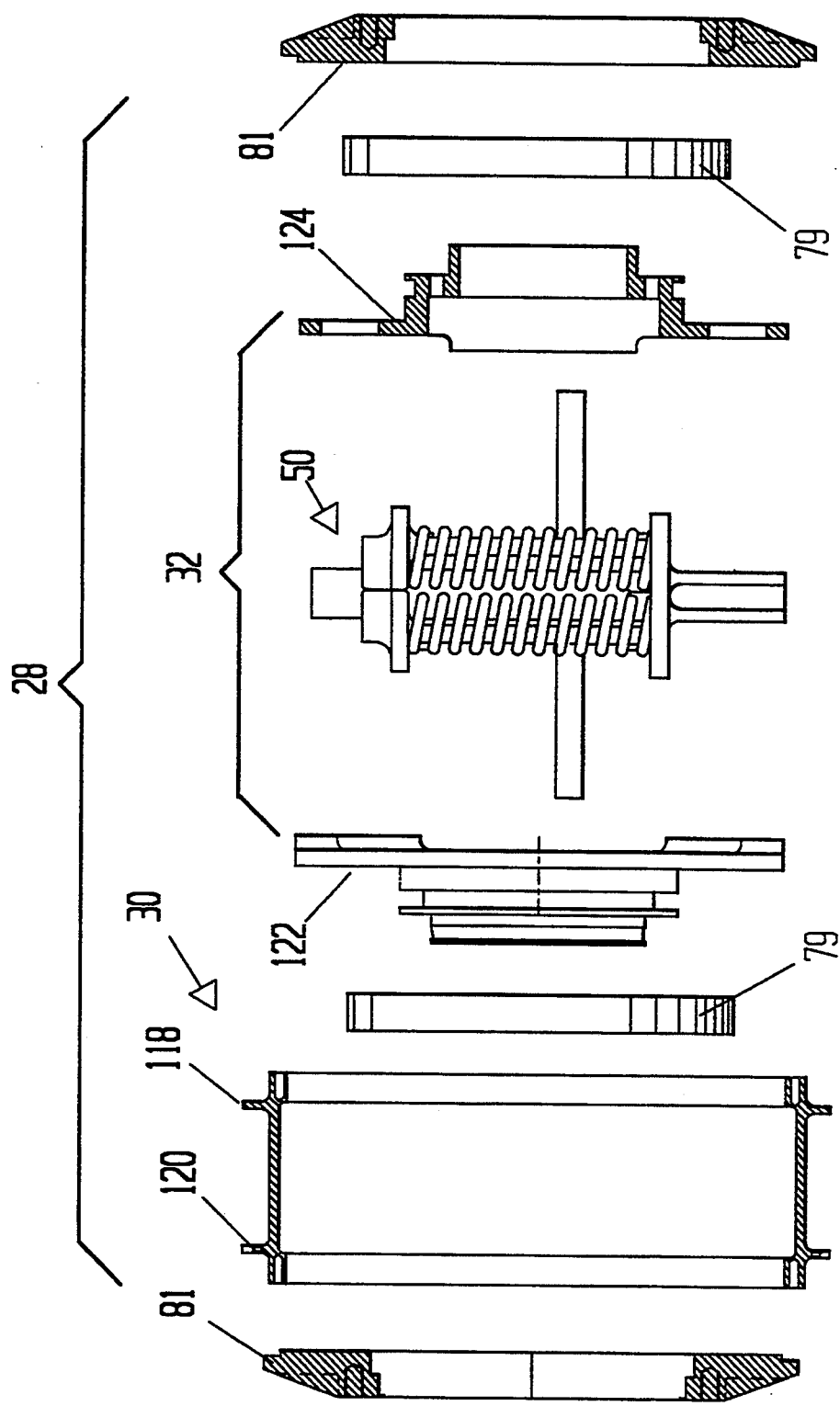
FIG. 9 is an exploded, elevational view of the assembly of the inner hub of the wheel.

Referring now to FIG. 9, there is shown an exploded, elevational view of the assembly of the wheel hub 28. The wheel hub 28 is an assembly of the outer hub 30, which is rotationally mounted on bearings which are supported by the opposite side plates 81 of the wheel hub 28. The outer hub 30 has a pair of spaced-apart, peripheral rims 118, which have a plurality of apertures 120 to receive the spokes 26 or an integral webbing which secure the wheel hub to the wheel rim 22. The inner hub 32 is an assembly of two opposite plates 122 and 124, and the aforementioned shock absorber mechanism 50, which are secured together with assembly bolts, not shown.

Figure 10:
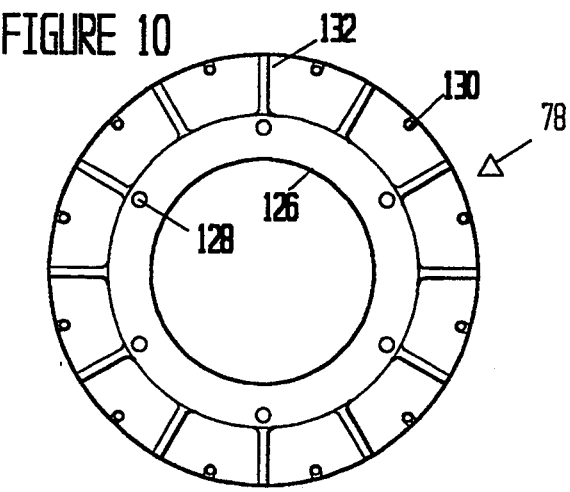
FIG. 10 is a view of the side plates used in the invention.

FIG. 10 is a side view of the side plate 81, two of which are used, on opposite sides, of the wheel hub assembly. Each side plate 81 has a central large aperture 126, with a plurality of internally threaded apertures 128 on a selected pattern to receive the bolts securing the side plates to the outer hub, and a peripheral row of evenly spaced through apertures 130 to receive the inner ends of spokes 26 (see FIG. 1). A plurality of reinforcement gussets 132 can be provided to strengthen the side plate 81.

Figure 11:
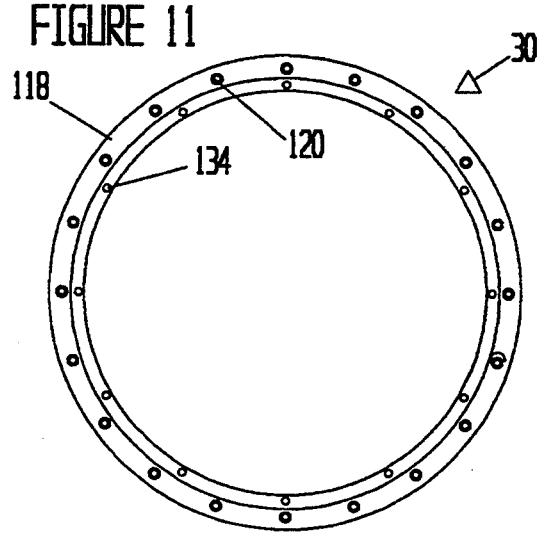
FIG. 11 is a view of the outer hub used in the invention.

FIG. 11 is a side view of the outer hub 30, which has an inner circular row of internally threaded apertures 134 on each side to receive the fasteners which secure the side plates 81, and the peripheral row of through apertures 120 in the peripheral rims 118 for receiving the spokes 26 of the wheel 10.

Figure 12:
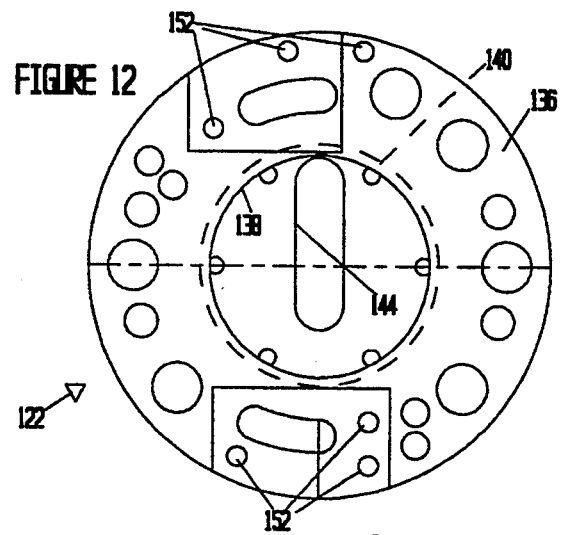
FIG. 12 and 13 are views of the opposite sides of the inner hub used in the invention.
Figure 13:
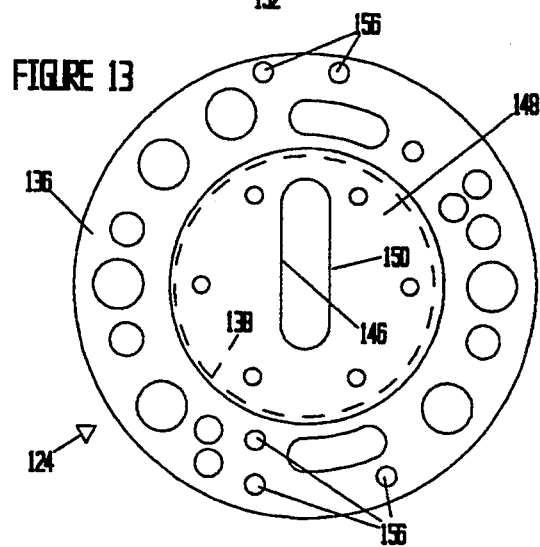

FIG. 12 illustrates the brake side plate 122 of the inner hub 32, and FIG. 13 illustrates the drive side plate 124 of the inner hub 32. Each plate is formed as a flat disc 136 having a large central opening 138 with a generally cylindrical boss 140 and 142 surrounding the central opening 138. Each boss has an elongated slot 144 and 146 in its face 148, and the slots are surrounded by walls 150. The brake side plate 122 has through apertures 152 which are located on a pattern that aligns the plate apertures 152 to the through apertures 154 of the track frame (see FIG. 4). The drive side plate 124 also has apertures 156 on a pattern to align with the through apertures 154 of the track frame and the apertures 152 in the brake side plate 122, thereby permitting insertion of five bolts which secure the assembly of the inner hub 32.

The central boss 140 and 142 of each inner hub plate has a circular array of evenly spaced, internally threaded apertures 158, which receive bolts which attach the inner hub mounting flange 36, shown in FIG. 1, which is attached to the inner hub with spacers of appropriate length. The side plates 122 and 124 are located, by means of large diameter bearings 79, to plates 81 (each side). These bearings permit the wheel to rotate about the shock absorber mechanism.

In the operation of the shock mechanism of the invention, the first and second nested shock absorbing springs are compressed as a result from a sudden loading on the rear wheel. The wheel rebounds from its deflected position to its normal position and, during this rebound movement, the rebound springs are compressed, dampening the rebound of the mechanism and preventing erratic cycling of the shock absorber mechanism.

The invention thus permits use of an unencumbered frame structure free of the various protruding appendages such as outboard shock absorbers, springs, trailing arms, and the like. Since the mechanism always maintains a constant tension on the sprocket chain or belt, maximum drive life is secured, resulting in lower cost operation and a greater freedom from maintenance. The shock mechanism is made of a minimum of parts, comprising only a frame and carrier assembly with three roller cam followers in the form of bearings that are pivotally mounted in the carrier assembly. The only other elements of the assembly comprise the three pluralities of compression springs which can be readily mounted between the opposing abutments of the frame and carrier. Preferably these springs are retained with a center rod or core.

If desired, the cam surfaces of the frame can be formed of a very wear resistant material, e.g., case hardened steel, carbide surfaces and the like, and these cam surfaces or linings can be removably attached to provide a shock mechanism that can be easily serviced and that will last for the entire life of the motorcycle.

The invention provides an excellent shock absorbency for the rear wheel of a motorcycle. Since the wheel moves in an arc about the output shaft of the motorcycle transmission, there is no change in tension on the chain or belt of the drive system. Instead, the tension on the sprocket drive remains constant regardless of the relative vertical movement of the rear wheel relative to the frame of the motorcycle.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A shock absorbing mechanism for a motorcycle having a rear wheel with an inner hub with a sprocket chain extending from a drive sprocket gear of said motorcycle to said rear wheel, which comprises:
   a. an open polygon frame having two opposite and substantially parallel walls with interior side walls having a curvature substantially equal to an arc at the radius of curvature about the drive sprocket gear of the motorcycle;
   b. a carrier mounted for movement with the frame and comprising first and second side plates which are secured together in a spaced-apart parallel array;
   c. a plurality of cam rollers pivotally mounted between the first and second side plates of the carrier and positioned adjacent the opposite side walls so as to be in rolling bearing contact with the interior side walls of the frame;
   d. a first fixed abutment bracket fixedly secured to one external edge of the frame adjacent an upper end of the frame and a second fixed abutment bracket secured to an opposite external edge of the frame;
   e. a first moving abutment bracket fixedly secured to a lower end of the carrier opposite said first fixed abutment bracket and a second moveable abutment bracket fixedly secured to an upper end of the carrier, opposite said second fixed abutment bracket;
   f. a first plurality of springs received between the first fixed and first moveable abutment brackets and a second plurality of compression springs retained between the second fixed and second moveable abutment brackets; and
   g. a wheel support shaft received between aligned journals on the first and second side plates of the carrier, orthogonal thereto.

2. The shock absorber of claim 1 including a second plurality of shock absorbing springs nested within the first plurality of springs.

3. The shock absorbing mechanism of claim 1 including rotational bearings within the journals in the first and second side plates of the carrier.

4. The shock absorber mechanism of claim 1 wherein the radius of curvature is from about 17 to about 25 inches.

5. The shock absorber mechanism of claim 1 in combination with a cylindrical rim having opposite end plates to form an interior chamber with said shock absorbing mechanism received within said chamber.

6. A wheel assembly including the shock absorber mechanism and cylindrical rim of claim 5 in further combination with an inner wheel hub rotationally mounted on said cylindrical rim and including a wheel rim concentrically surrounding said inner hub and secured thereto by web means.

7. The wheel assembly of claim 6 wherein said web means comprises either a plurality of spokes or an integral casting.

8. The wheel assembly of claim 6 wherein said web means comprises a solid annular rib between the outer hub and wheel rim.

9. The shock absorber mechanism of claim 1 including a mounting bracket fixedly secured to said inner hub.

10. The shock absorber mechanism of claim 5 wherein said cylindrical rim has a central aperture in each of said end plates and said wheel shaft is received in said apertures, said apertures being of greater diameter than said shaft to permit a displacement of the wheel shaft within said apertures.

* * * * *